United States Patent
Tanaka

(10) Patent No.: US 6,689,712 B1
(45) Date of Patent: Feb. 10, 2004

(54) PROCESS FOR PRODUCING HYDROFINING CATALYST

(75) Inventor: Hideo Tanaka, Toda (JP)

(73) Assignee: Japan Energy Corporation, Tokyo (JP)

(*) Notice: Subject to any disclaimer, the term of this patent is extended or adjusted under 35 U.S.C. 154(b) by 0 days.

(21) Appl. No.: 09/959,202

(22) PCT Filed: Apr. 20, 2000

(86) PCT No.: PCT/JP00/02564

§ 371 (c)(1),
(2), (4) Date: Oct. 19, 2001

(87) PCT Pub. No.: WO00/62924

PCT Pub. Date: Oct. 26, 2000

(30) Foreign Application Priority Data

Apr. 20, 1999 (JP) ............................................ 11-111883

(51) Int. Cl.[7] .............................................. B01J 23/00
(52) U.S. Cl. ....................... 502/305; 502/314; 502/439; 502/208; 502/210; 502/211; 502/213; 502/313; 502/315; 208/108; 208/116; 208/251 H; 208/254 H; 208/110
(58) Field of Search ................................ 208/108, 116, 208/251 H, 254 H, 110; 502/314, 439, 208, 210, 211, 213, 305, 313, 315

(56) References Cited

U.S. PATENT DOCUMENTS

| 3,629,146 A | 12/1971 | Adams |
| 4,455,390 A | 6/1984 | Ting et al. |
| 5,322,616 A | 6/1994 | Dai et al. |
| 5,436,215 A | 7/1995 | Dai et al. |

FOREIGN PATENT DOCUMENTS

| JP | 0 673 678 A1 | 9/1995 |
| JP | 07-256106 | 10/1995 |
| JP | 07-256110 | 10/1995 |

*Primary Examiner*—Walter D. Griffin
*Assistant Examiner*—James Arnold, Jr.
(74) *Attorney, Agent, or Firm*—Birch, Stewart, Kolasch & Birch, LLP

(57) ABSTRACT

A hydrorefining catalyst containing a metal belonging to group VIB of the Periodic Table and phosphorus is made by bringing the supporting liquid into contact with a porous carrier formed of inorganic oxide. The supporting liquid is an aqueous solution of a metal belonging to group VIB of the Periodic Table, a phosphorus compound, a hydroxycarboxylic acid, and hydrogen peroxide added to water. Thee hydroxycarboxylic acid content of the supporting liquid is such that molar ratio of group VIB metal:hydroxycarboxylic acid is 1:0.05 to 1:1 and the hydrogen peroxide content of the supporting liquid is such that molar ratio of group VIB metal:hydrogen peroxide is 1:0.03 to 1:1. The catalyst made with the supporting liquid has excellent desulfurization activity.

8 Claims, No Drawings

PROCESS FOR PRODUCING HYDROFINING CATALYST

This application is the national phase under 35 U.S.C. §371 of PCT International Application Ser. No. PCT/JP00/02564 which has an International filing date of Apr. 20, 2000, which designated the United States of America and was published in English.

TECHNICAL FIELD

The present invention pertains to a method of producing a hydrorefining catalyst used in desulfurization of hydrocarbon oils, such as petroleum, etc., and particularly pertains to a method of producing a hydrorefining catalyst that uses a specific supporting solution for supporting the hydrogenation active metal.

BACKGROUND ART

Conventional hydrorefining catalysts are produced by supporting an active metal with demetallation activity, hydrogenation activity, etc., on a porous carrier made of an inorganic oxide, such as alumina, etc. By means of hydrorefining, it is possible to remove the hetero elements such as sulfur, nitrogen, and metal components (vanadium, nickel, iron, etc.) contained in hydrocarbon oil by bringing hydrocarbon oil into contact with a hydrorefining catalyst in the presence of hydrogen. Various studies have been performed in the past on active metals, properties of carriers, pore structure, methods of supporting active metals, etc., in order to improve the ability for removing hetero elements from this type of hydrorefining catalyst.

U.S. Pat. No. 3,629,146 discloses that phosphorus and hydrogen peroxide as stabilizers are added to the supporting liquid in order to prepare a molybdenum and nickel supporting liquid at a high concentration and with superior catalyst life. Moreover, U.S. Pat. No. 4,455,390 discloses the method for preparing a catalyst using a supporting liquid with a pH of 1 or lower comprising group VIB metals and citric acid.

The object of the present invention is to obtain a catalyst with even better activity by improving the composition of the supporting liquid that will be used in the production of the hydrorefining catalyst.

DISCLOSURE OF THE INVENTION

As a result of performing intensive research in order to accomplish the above-mentioned object, the inventor has discovered that when an organic acid, such as citric acid, etc., and hydrogen peroxide are further added to a supporting liquid containing a metal belonging to group VIB of the Periodic Table and phosphorus, a catalyst with excellent desulfurization activity can be prepared.

According to the present invention, a method of producing a hydrorefining catalyst is provided, which comprises the steps of preparing a supporting liquid by adding a metal belonging to group VIB of the Periodic Table, a phosphorus compound, a hydroxycarboxylic acid, and hydrogen peroxide to a solvent and bringing the prepared supporting liquid into contact with a porous carrier formed of an inorganic oxide. It is preferred that the amount of hydroxycarboxylic acid added to the supporting liquid be adjusted such that molar ratio of group VIB metal: hydroxycarboxylic acid is 1:0.05 to 1:1 and the amount of hydrogen peroxide added to the supporting liquid be adjusted such that molar ratio of group VIB metal: hydrogen peroxide is 1:0.03 to 1:1.

It is preferred that the phosphorus compound be phosphoric acid and that the hydroxycarboxylic acid be citric acid. It is preferred that the metal belonging to group VIB of the Periodic Table be molybdenum and it is preferred that at least one of cobalt and nickel be further added to the supporting liquid. In this case, it is preferred that the supporting liquid be prepared so that the hydrorefining catalyst that is obtained contains 6 to 20 wt % molybdenum in terms of metal weight, 1 to 8 wt % cobalt and/or nickel in terms of metal weight, and 0.1 to 5 wt % phosphorus in terms of phosphorus weight.

BEST MODE FOR CARRYING OUT THE INVENTION

Carrier

Any carrier can be used for the catalyst as long as it is prepared from an inorganic substance that is generally used as a catalyst carrier, examples being carriers made from oxides of groups II, III, and IV of the Periodic Table. In particular, at least one type of oxide, such as silica, alumina, magnesia, zirconia, boria, titania, calcia, zinc oxide, etc., can be used. Of these, a carrier consisting of alumina (various crystal structures, including $\alpha$, $\gamma$, $\delta$, $\eta$, $\chi$, etc.), silica-alumina, silica, alumina-magnesia, silica-magnesia, alumina-silica-magnesia, etc., particularly a carrier of $\gamma$-alumina or silica content added to $\gamma$-alumina, is preferred. Moreover, the catalyst shape can be spherical, cylindrical, trilobular, or quadrilobular.

The preferred carrier properties when the hydrorefining catalyst is used as a desulfurization catalyst for middle distillate products are as follows: The specific surface area as determined by the nitrogen gas adsorption method is 100 to 400 $m^2$/g, with 200 $m^2$/g or more being particularly preferred, the pore volume is 0.3 to 1 ml/g, with 0.5 ml/g or more being particularly preferred, and the median pore diameter is 30 to 200 Å, with 40 to 120 Å being particularly preferred.

Supporting Liquid

The supporting liquid used in the present invention is an aqueous solution of a metal belonging to group VIB of the Periodic Table, a phosphorus compound, a hydroxycarboxylic acid, and hydrogen peroxide added to and mixed with a solvent such as water, preferably ion-exchanged water. The amount of hydroxycarboxylic acid added to the supporting liquid preferably is adjusted such that molar ratio of group VIB metal: hydroxycarboxylic acid is 1:0.05 to 1:1, particularly 1:0.1 to 1:0.7, and the amount of hydrogen peroxide added to the supporting liquid preferably is adjusted such that molar ratio of group VIB:hydrogen peroxide is 1:0.03 to 1:1, particularly 1:0.1 to 1:0.5. If the amount of hydroxycarboxylic acid or hydrogen peroxide is less than the above-mentioned range, there will be little effect in terms of improvement of catalyst activity, while if the amount added exceeds the above-mentioned range, almost no further improvement of catalyst activity can be expected and production cost will increase.

Tungsten, molybdenum, etc., are used as the metal belonging to group VIB of the Periodic Table. The metal belonging to group VIB of the Periodic Table is added to the supporting liquid as a compound, such as an oxide, ammonium salt, chloride, etc. The concentration of metal belonging to group VIB of the Periodic Table in the supporting liquid is 0.5 to 6 moles/liter, preferably 0.9 to 4 moles/liter.

It is preferred that phosphoric acid, phosphorous acid, ammonium phosphate, etc., be is used as the phosphorus compound. The concentration of phosphorus compound in the supporting liquid is 0.05 to 5 moles/liter, preferably 0.2 to 2 moles/liter, in terms of the concentration of phosphorus element.

Citric acid, malic acid, tartaric acid, etc., can be used as the hydroxycarboxylic acid, but citric acid is particularly preferred.

With respect to preparation of the supporting liquid, first, an aqueous solution is obtained by adding phosphorus compound to a slurry of a compound of a metal belonging to group VIB and other components, for instance, a compound of a metal belonging to group VIII, suspended in water. The supporting liquid of the present invention is obtained by adding a predetermined amount of hydroxycarboxylic acid and then, a predetermined amount of hydrogen peroxide to this aqueous solution.

It is preferred that at least one of cobalt and nickel is contained in the supporting liquid as the other components. These are added to the supporting liquid as compounds, such as carbonates, nitrates, organic acid salts, chlorides, etc. The concentration of cobalt and/or nickel in the supporting liquid is 0.1 to 3 moles/liter, preferably a 0.3 to 2 moles/liter.

Supporting Method

The method is normally used whereby after bringing the above-mentioned carrier and supporting liquid into contact with each other, drying and calcination are performed. Methods known as pore filling, immersion, etc., are methods of bringing a carrier and supporting solution into contact with each other, and pore filling methods are particularly preferred. Pore filling methods such as spray impregnation are methods whereby supporting liquid is brought into contact with a carrier with supporting liquid in the same proportion as carrier pore volume (0.5-fold to 1.5-fold pore volume in terms of volume) in the form of a mist.

Drying is usually performed for 10 minutes to 24 hours within a temperature range of 50 to 180° C., preferably 80 to 150° C. Calcination is performed within a temperature range of 400° C. to 600° C., particularly 450 to 550° C., with the ideal time for which temperature is raised up to the calcination temperature being 10 to 240 minutes and the ideal retention time at the calcination temperature being 1 to 240 minutes.

Hydrorefining Catalyst

The obtained hydrorefining catalyst preferably contains 6 to 20 wt %, particularly 10 to 15 wt %, molybdenum in terms of metal weight, 1 to 8 wt %, particularly 1 to 5 wt %, cobalt and nickel in terms of metal weight, and 0.1 to 5 wt %, particularly 0.2 to 2 wt %, phosphorus in terms of phosphorus weight.

The catalyst of the present invention may have a specific surface area of 50 to 350 $m^2/g$, preferably 150 to 300 $m^2/g$, a pore volume of 0.1 to 1 cc/g, preferably 0.3 to 0.8 cc/g, and a medium pore diameter of 30 to 200 Å, preferably 40 to 120 Å.

Catalyst shape can be columnar, spherical, or tablet-shaped, but columnar shape is preferred. The cross-section shape of the columnar shaped catalyst can be any of cylindrical, trilobular, quadrilobular, etc. Cross-section dimensions of the same can be 0.1 mm to 10 mm, but 0.7 to 3 mm is preferred.

Hydrorefining

The catalyst of the present invention can be used for hydrorefining with middle distillate products, naphtha, kerosene, vacuum distilled gas oil, residue, etc., of direct distillation or cracking serving as the feed oil. However, middle distillate products of direct distillation or cracking are particularly preferred as the feed oil. The term middle distillate products herein means the fraction in which a 50% distillation temperature is approximately 250 to 350° C. and a 90% distillation temperature is approximately 300 to 400° C.

The hydrorefining conditions in the present invention are ideally selected from within a range of a reaction temperature of 250 to 500° C., preferably 300 to 450° C., a reaction pressure of 1 to 30 MPa, preferably 3 to 20 MPa, a hydrogen flow rate of 50 to 5,000 L/L, preferably 100 to 2,000 L/L, by hydrogen/oil ratio, and a liquid space velocity (LHSV) of 0.1 to 10/hour, preferably a 0.2 to 5/hour.

The hydrorefining catalyst of the present invention is preferably used when the total amount of sulfur in the refined oil is to be reduced to below the total amount of sulfur in the same feed oil, particularly when the total sulfur content of the middle distillate products after refining is to be brought to 0.05% or less.

According to the present invention, a hydrorefining catalyst is obtained with higher hydrorefining activity than catalysts supporting a metal belonging to group VIB of the Periodic Table and phosphorus obtained by conventional production methods. In particular, according to the present invention, a hydrorefining catalyst that is ideal for hydrorefining wherein deep desulfurization (desulfurization up to a sulfur content of 500 ppm or less) is performed with the middle distillate products of direct distillation or cracking as the feed oil.

EXAMPLE

The present invention will now be described in detail with examples.

Preparation of Catalyst A: Example 1

A suspension of 39.12 g of molybdenum trioxide, 13.66 g of cobalt carbonate, and 5.96 g of 85% phosphoric acid in 65 ml ion-exchange water was heated and agitated to obtain a solution. To this solution, 30 grams of citric acid and then 10 g of 34% aqueous hydrogen peroxide were added, and diluted with ion-exchanged water to prepare the supporting liquid. One-hundred fifty grams of Carrier X were impregnated with the total amount of supporting liquid by the pore filling method. Carrier X was a 1/20" trilobular pellet-shaped carrier whose main component was γ-alumina and it had a specific surface area of 280 $m^2/g$ and pore volume of 0.64 cc/g. The impregnated product was dried overnight at 130° C. and then baked for 30 minutes at 550° C. in a ventilated-type rotary kiln to prepare catalyst A.

Preparation of Catalyst B: Comparative Example 1

Catalyst B was prepared as was Catalyst A except that citric acid was not added when the supporting solution was prepared.

Preparation of Catalyst C: Comparative Example 2

Catalyst C was prepared as was Catalyst A except that citric acid and hydrogen peroxide was not added when the supporting solution was prepared.

Preparation of Catalyst D: Comparative Example 3

One-hundred fifty grams Carrier X were impregnated by the pore filling method with the total amount of supporting liquid obtained by agitating and dissolving 38.20 g of ammonium paramolybdate, 13.48 g of cobalt carbonate, 14.70 g of 85% phosphoric acid, and 30 g of citric acid in 85 ml ion-exchanged water and diluting with ion-exchanged water. The impregnated product was dried overnight at 130° C. and then baked for 30 minutes at 550° C. with a ventilated-type rotary kiln to obtain Catalyst D.

Preparation of Catalyst E: Example 2

A suspension of 39.12 g of molybdenum trioxide, 13.66 g of cobalt carbonate, and 5.96 g of 85% phosphoric acid in 65 ml ion-exchanged water was heated and agitated to obtain a solution. To this solution, 30 grams of citric acid and then 10 g of aqueous 34% hydrogen peroxide were added, and diluted with ion-exchanged water to prepare the supporting liquid. 150 grams of Carrier Y were impregnated with the total amount of this supporting liquid by the pore filling method. Carrier Y was a 1/20" trilobular pellet-shaped carrier whose main component was γ-alumina and it had a specific surface area of 281 $m^2$/g and an pore volume of 0.74 cc/g. The impregnated product was dried overnight at 130° C. and then baked for 30 minutes at 550° C. in a ventilated-type rotary kiln to prepare Catalyst E.

Preparation of Catalyst F: Comparative Example 4

Catalyst F was prepared as was Catalyst E except that citric acid was not added when the supporting solution was prepared. The properties of above-mentioned Catalysts A through F are shown in Table 1 and Table 2.

TABLE 1

| Catalyst | Carrier | Composition (wt %) | | | Organic acid | $H_2O_2$ | Reaction temperature (° C.) | ΔT[1] (° C.) |
| | | Mo | Co | P | | | | |
|---|---|---|---|---|---|---|---|---|
| A (Example) | X | 13 | 3 | 0.8 | Citric acid 30 g | 10 g | 340.5 | −1.8 |
| B | X | 13 | 3 | 0.8 | None | 10 g | 347.1 | 4.8 |
| C | X | 13 | 3 | 0.8 | None | None | 342.3 | 0[2] |
| D | X | 11 | 3 | 2 | Citric acid 30 g | None | 344.7 | 2.5 |

[1]ΔT: Temperature difference
[2]Reference standard

TABLE 2

| Catalyst | Carrier | Composition (wt %) | | | Organic acid | $H_2O_2$ | Reaction temperature (° C.) | ΔT[1] (° C.) |
| | | Mo | Co | P | | | | |
|---|---|---|---|---|---|---|---|---|
| E (Example) | Y | 13 | 3 | 0.8 | Citric acid 30 g | 10 g | 345.0 | −3.0 |
| F | Y | 13 | 3 | 0.8 | Citric acid 30 g | None | 348.0 | 0[2] |

[1]ΔT: Temperature difference
[2]Reference standard

Hydrorefining Experiment

Hydrorefining experiments with Middle East direct distillation gas oil as the feed oil were conducted using Catalysts A through F. The properties of the feed oil were follows: density; 0.856 g/ml, sulfur content; 1.62 wt %, nitrogen content; 134 ppm by weight, and 95% distillation point; 367° C. The hydrorefining reaction conditions were follows: hydrogen pressure; 5.0 MPa, liquid space velocity; 2.0 $hr^{-1}$, and hydrogen/oil ratio; 200 NL/L. The sulfur content of the product oil obtained at a reaction temperature of 320° C., 330° C., 340° C., and 350° C. was analyzed. The desulfurization reaction rate constant was determined and the Arrhenius plot for the desulfurization reaction was drafted with the reaction order for desulfurization being the 1.5 order. The reaction temperature needed to bring the sulfur content of the product oil to 300 ppm using each catalyst was determined from the Arrhenius plot. The results of comparisons using Catalysts C and F as the respective reference standards are shown in Table 1 and Table 2.

As is clear from Table 1, a catalyst with excellent desulfurization activity is obtained in a case that citric acid and hydrogen peroxide have been added to the supporting liquid (Catalyst A) when a metal belonging to group VIB, a metal belonging to group VIII, and phosphorus are supported. In contrast to this, it is clear that when only hydrogen peroxide has been added to the supporting liquid (Catalyst B) and when only citric acid has been added to this supporting liquid (Catalyst D), there is a reduction in catalyst activity in comparison to when neither citric acid or hydrogen peroxide have been added (Catalyst C). Moreover, as is clear from Table 2, when a metal belonging to group VIB, a metal belonging to group VIII, and phosphorus are supported, there is improvement in catalytic activity when citric acid and hydrogen peroxide have been added to the supporting liquid (Catalyst E) in comparison to when only citric acid has been added (Catalyst F).

INDUSTRIAL APPLICABILITY

According to the present invention, a hydrorefining catalyst is obtained with higher hydrorefining activity than catalysts supporting a metal belonging to group VIB of the Periodic Table and phosphorus that have been obtained by conventional production methods. In particular, a hydrorefining catalyst that is ideal for hydrorefining whereby deep desulfurization of middle distillate products from direct distillation or cracking is obtained by the present invention. Hydrorefining, such as desulfurization, etc., can be effectively and efficiently accomplished by using a hydrorefining catalyst produced by the present invention, and as a result, petroleum products that are environment-friendly can be realized.

What is claimed is:

1. A method of producing a hydrorefining catalyst, comprising the steps of:

preparing a supporting liquid by adding a metal belonging to group VIB of the Periodic Table, a phosphorus compound, a hydroxycarboxylic acid, and hydrogen peroxide to a solvent and bringing the supporting liquid into contact with a carrier formed from a porous inorganic oxide.

2. A method of producing a hydrorefining catalyst according to claim 1, wherein the amount of hydroxycarboxylic acid added to the supporting liquid is such that molar ratio of group VIB metal:hydroxycarboxylic acid is 1:0.05 to 1:1 and the amount of hydrogen peroxide added to said supporting liquid is such that molar ratio of group VIB metal:hydrogen peroxide is 1:0.03 to 1:1.

3. A method of producing a hydrorefining catalyst according to claim 2, wherein the amount of said hydroxycarboxylic acid added is such that molar ratio of group VIB metal:hydroxycarboxylic acid is 1:0.1 to 1:0.7 and the amount of hydrogen peroxide added is such that molar ratio of group VIB metal:hydrogen peroxide is 1:0.1 to 1:0.5.

4. A method of producing a hydrorefining catalyst according to claim 1, wherein said hydroxycarboxylic acid is citric acid.

5. A method of producing a hydrorefining catalyst according to claim 1, wherein said phosphorus compound is phosphoric acid.

6. A method of producing a hydrorefining catalyst according to claim 1, wherein said group VIB metal is molybdenum.

7. A method of producing a hydrorefining catalyst according to claim 6 further comprising the step of adding at least one of cobalt and nickel to said supporting liquid.

8. A method of producing a hydrorefining catalyst according to claim 7, wherein the supporting liquid is prepared so that a produced hydrorefining catalyst contains 6 to 20 wt % of molybdenum in terms of metal weight, 1 to 8 wt % of at least one of said cobalt and nickel in terms of metal weight, and 0.1 to 5 wt % of phosphorus in terms of phosphorus weight.

* * * * *